(12) United States Patent
Stevenson, Jr.

(10) Patent No.: US 6,915,825 B1
(45) Date of Patent: Jul. 12, 2005

(54) SELF-TENSIONING TIRE CABLE CHAIN SYSTEM

(76) Inventor: Peter K. Stevenson, Jr., P.O. Box 10455, South Lake Tahoe, CA (US) 96158

( * ) Notice: Subject to any disclaimer, the term of this patent is extended or adjusted under 35 U.S.C. 154(b) by 0 days.

(21) Appl. No.: 10/434,819

(22) Filed: May 7, 2003

Related U.S. Application Data

(60) Provisional application No. 60/411,950, filed on Sep. 18, 2002.

(51) Int. Cl.$^7$ .......................... B60C 11/00; B60C 27/00
(52) U.S. Cl. ...................... 152/218; 152/216; 152/222
(58) Field of Search ........................ 152/213 R, 213 A, 152/216–219, 221–222, 231, 239, 241, 172, 152/187

(56) References Cited

U.S. PATENT DOCUMENTS

| | | | |
|---|---|---|---|
| 3,951,194 A | 4/1976 | Bourcier de Carbon de Previnquieres | 152/221 |
| 4,098,314 A | 7/1978 | Welsh | 152/213 |
| 4,130,155 A | 12/1978 | Barnett et al. | 152/217 |
| 4,146,075 A | 3/1979 | Riedel | 152/213 |
| 4,216,811 A | 8/1980 | Gray | 152/213 |
| 4,366,849 A * | 1/1983 | Martinelli | 152/221 |
| 4,366,850 A * | 1/1983 | Coutts | 152/222 |
| 4,830,078 A * | 5/1989 | Chang | 152/222 |
| 4,862,936 A * | 9/1989 | McDonough | 152/216 |
| 5,103,885 A * | 4/1992 | Chang | 152/222 |
| 5,147,479 A * | 9/1992 | Koshi et al. | 152/216 |
| 6,089,291 A | 7/2000 | Romolo et al. | 152/231 |
| 6,536,491 B2 * | 3/2003 | Martinez | 152/218 |
| 6,619,353 B1 * | 9/2003 | Kim | 152/225 R |

OTHER PUBLICATIONS

Hi-One.com; Automotive: Tires, six pages downloaded from Internet, copyright 2001.
Tire chains parts and accessories and tools, six pages downloaded from Internet, copyright 1998-2000.

* cited by examiner

Primary Examiner—Russell D. Stormer
Assistant Examiner—Jason R. Bellinger
(74) Attorney, Agent, or Firm—Sierra Patent Group, Ltd.

(57) ABSTRACT

A tire cable chain system is disclosed. The tire cable chain system includes a continuous and unbroken outboard annular holder; a tensioning cable adapted to form at least one tensioning cross member and a continuous and unbroken inboard annular holder disposed in physical contact with the outboard annular holder; a first receiver guide disposed on the outboard annular holder and adapted to receive the tensioning cable; a second receiver guide disposed on the inboard annular holder and adapted to receive the tensioning cable; a hub having a tensioned spool shaft connected to the tension cable; at least one stabilizing cable connected to the hub and the outboard annular holder; and at least one cross member disposed at a physical connection between the outboard annular holder and the inboard annular holder.

19 Claims, 8 Drawing Sheets

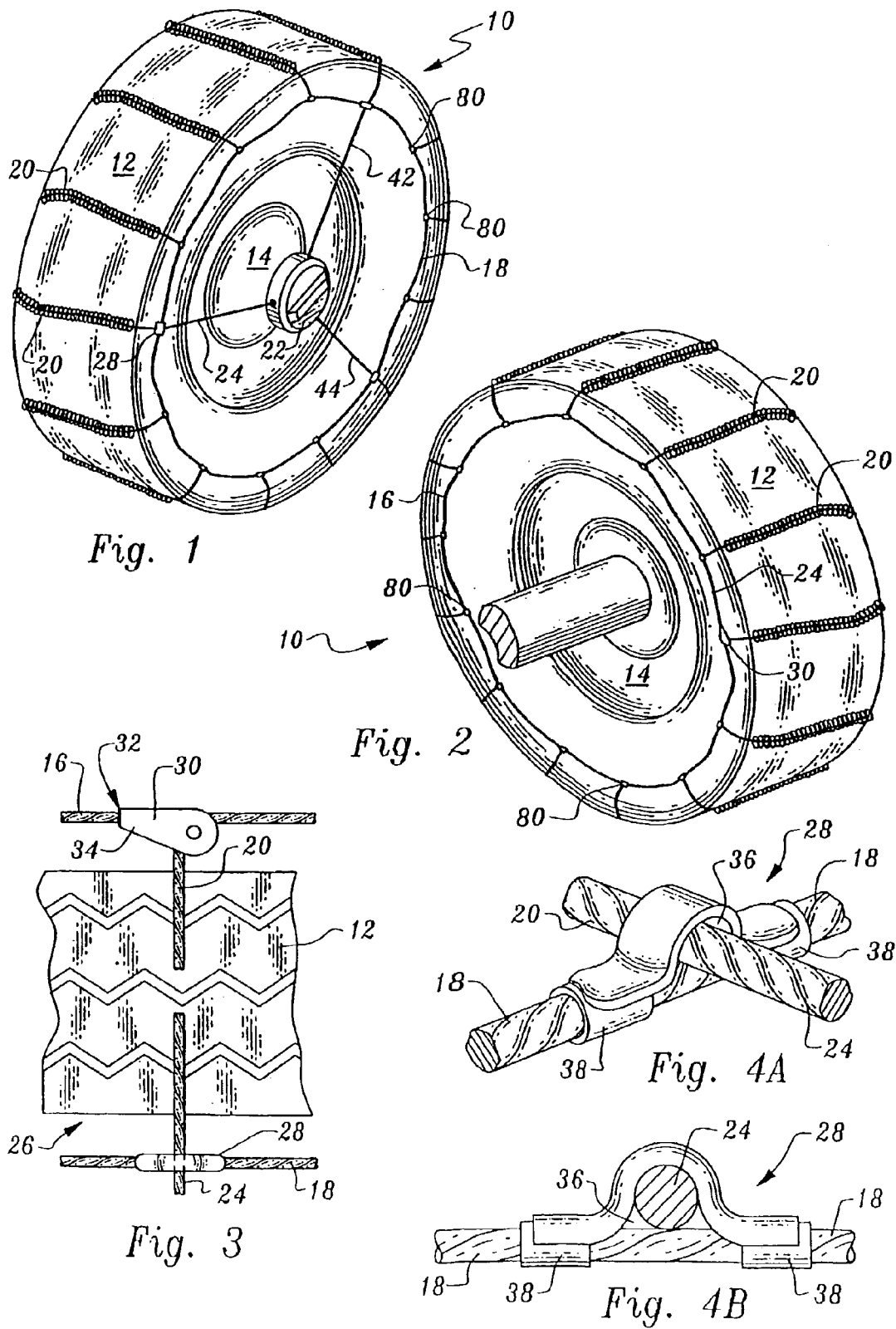

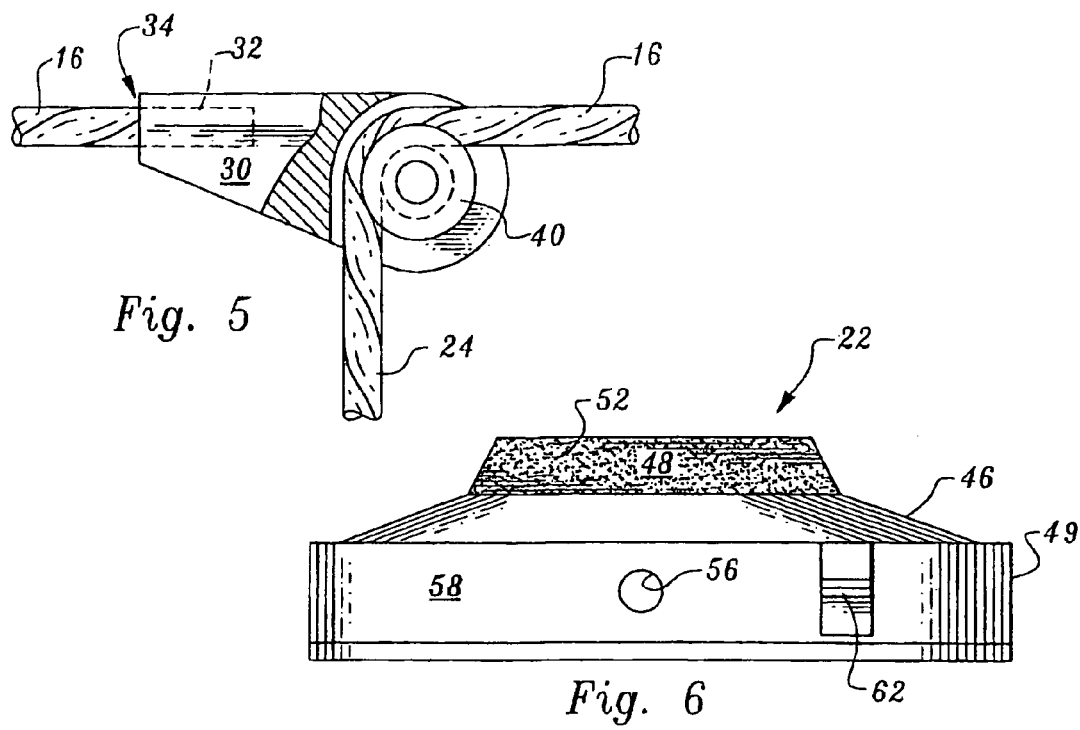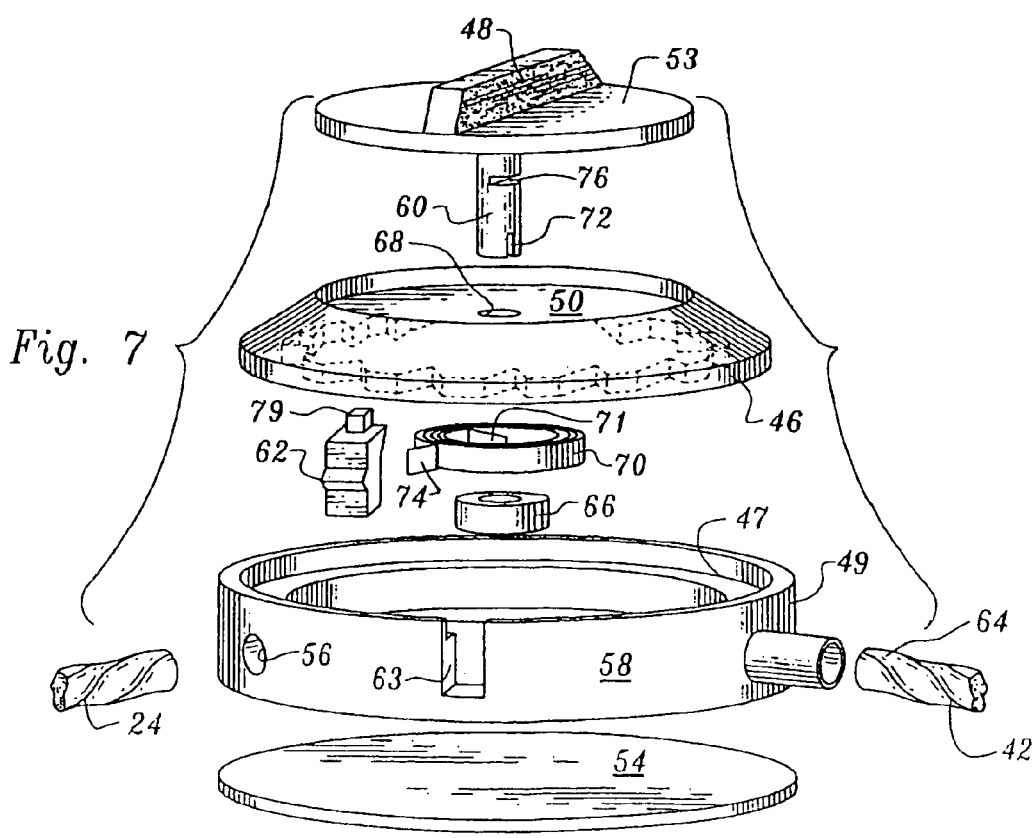

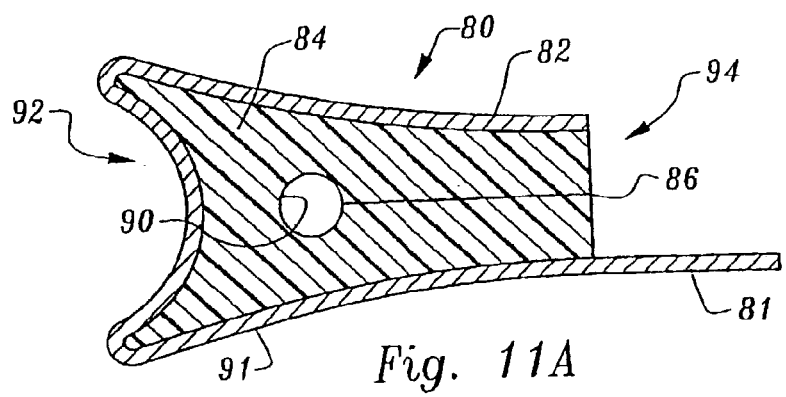
*Fig. 11A*
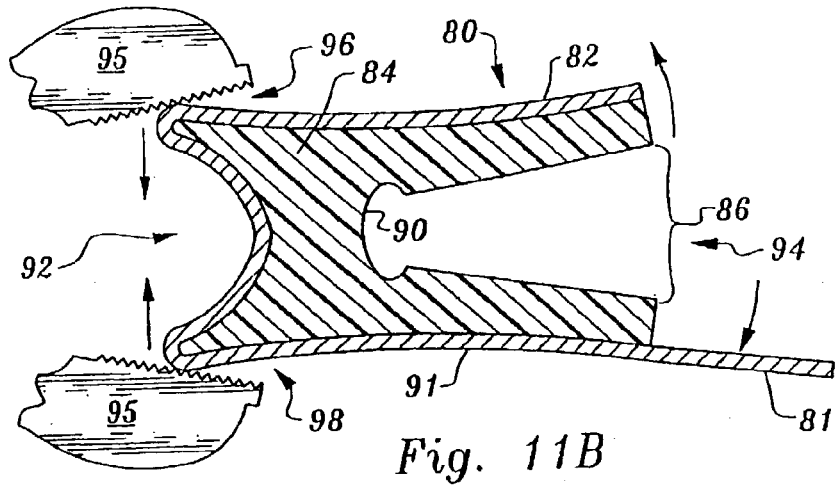
*Fig. 11B*
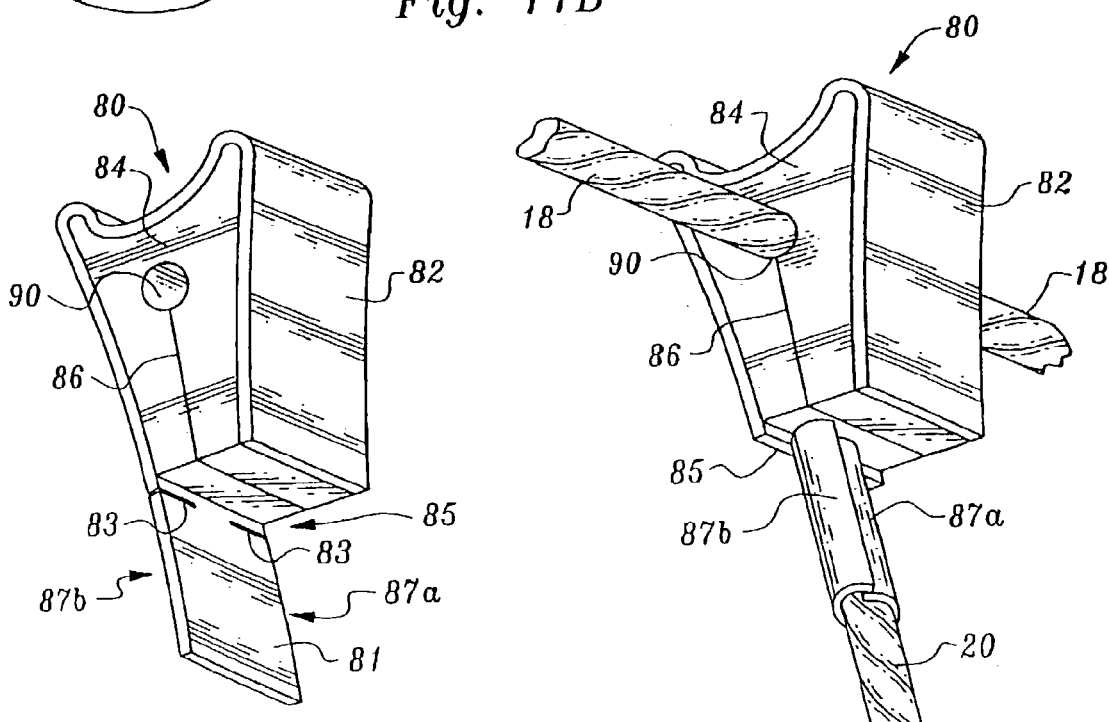
*Fig. 11C*
*Fig. 11D*

SELF-TENSIONING TIRE CABLE CHAIN SYSTEM

RELATED APPLICATION INFORMATION

This application claims benefit of U.S. Provisional Application Ser. No. 60/411,950, filed Sep. 18, 2002.

BACKGROUND

This invention relates to a tire chain assembly and more specifically, relates to a tire cable chain system having a self-tensioning feature.

Tire chains have been in existence for many years and cable-style tire chains (hereinafter "cable" chains) have gained popularity. As is known, a tire cable chain assembly generally consists of two annular side holders made of cable on the inner side and outer side of the tire, respectively. These side holders are each held together in annular form by a closeable clasp, hook, or similar fastener during operation. A plurality of traction cables cross over the road engaging surface of the tire, between the two annular side holders to provide traction for the tire.

Cable chains are much lighter in weight than standard tire chains, a fact that has contributed to their growing popularity. Cable chains are generally sized to fit differently sized tires and the fit is generally snug on the tire when the chains are fitted to the tire that they are designed for. However, installing cable chains is still a laborious process as the snug fit requires the installer to laboriously struggle to get the chains around the tire and connect the hooks or clasps on the open ends to close up the annular side holders. This installation process usually requires the installer to lay or kneel on the ground, in snow or mud, to fit the chains to the tire on both its inboard and outboard sides. This is a labor-intensive and messy process.

Another problem with cable chains arises when it is desired to use them on tires for which they are not fitted, as they simply cannot be installed. Hence, there is no one size that can fit many differently sized automobile tires. As a result, a family with different cars or trucks generally must have a set of cable chains for each car, rather than have one set which can be used on any of the vehicles.

Therefore, a need exists for a cable chain system that can be easily installed on a tire and which can adapt to differently sized tires.

SUMMARY

The invention overcomes the drawbacks of the prior art by providing a cable chain system that is capable of expanding at least one annular holder so that the system can be easily fitted over a number of differently sized tires. In the preferred embodiment, the annular holders are continuous and unbroken, without end connectors. The system has a hub having a tensioned spool shaft connected to a tension cable, which winds around the spool shaft. The tension cable exits the hub and crosses over from the outboard annular holder to the inboard holder and is thereby incorporated as one of the cable cross members that comprise the traction portion of the system. The tension cable further serves to provide both play for expanding the annular holder on the inboard tire side and to provide tension for tightening the system around the tire. In use, the tension cable is spooled out until the inboard annular holder is of a circumference large enough to be looped over a tire. The user then continues to play out the tension cable and stretch the cable chain system over the tire until the majority of the system is in place around the tire. Any portion of the car tire that is still touching the ground and free of the system can be covered by advancing the car a few feet, thereby rotatably advancing the tire until the uncovered portion is exposed and the remainder of the system can then be looped over the tire for full coverage. The tension cable then automatically spools in a tightening fashion to gather up any slack in the system. As a final step the hub can be ratcheted to further gather up any loose tension cable and then locked in the ratcheted position.

The disclosed device is directed towards a tire cable chain system. The tire cable chain system comprises a continuous and unbroken outboard annular holder. A tensioning cable is adapted to form at least one tensioning cross member and a continuous and unbroken inboard annular holder is disposed in physical contact with the outboard annular holder. A first receiver guide is disposed on the outboard annular holder and adapted to receive the tensioning cable. A second receiver guide is disposed on the inboard annular holder and adapted to receive the tensioning cable. A hub having a tensioned spool shaft is connected to the tension cable. At least one stabilizing cable is connected to the hub and the outboard annular holder. At least one cross member is disposed at a physical connection between the outboard annular holder and the inboard annular holder.

The disclosed method is directed towards a method of installing tire cable chain system on a tire. The method comprises providing the tire cable chain system including the following elements. A continuous and unbroken outboard annular holder is disposed in physical contact with a tensioning cable adapted to form at least one tensioning cross member and a continuous and unbroken inboard annular holder. A first receiver guide is disposed on the outboard annular holder and is adapted to receive the tensioning cable. A second receiver guide is disposed on the inboard annular holder and is adapted to receive the tensioning cable. A hub having a tensioned spool shaft is connected to the tension cable. At least one stabilizing cable is connected to the hub and the outboard annular holder. At least one cross member is disposed at a physical connection between the outboard annular holder and the inboard annular holder. The method further includes pulling the tensioning cable from the hub to create a slack state of the tensioning cable. The method includes engaging a toggle switch disposed in the hub to a locked position to retain the slack state. The method includes disposing the tire cable chain system over the tire. The method includes disengaging the toggle switch from the locked position and engaging the hub to tighten the tire cable chain system over the tire.

In another embodiment, the disclosed device is directed towards a dual wheel tire cable chain system. The system comprises a first tire cable chain including the following elements. A first tensioning cable adapted to form a first tensioning cross member and a first continuous and unbroken inboard annular holder disposed in physical contact with a first continuous and unbroken outboard annular holder. A first slidable receiver guide is disposed on the first outboard annular holder and is adapted to receive the tensioning cable. A second slidable receiver guide is disposed on the first inboard annular holder and is adapted to receive the tensioning cable. A hub having a tensioned spool shaft is connected to the tensioning cable. At least one stabilizing cable is connected to the hub and the first outboard annular holder. At least one cross member is disposed at a physical connection between the first outboard annular holder and the first inboard annular holder. A second tire cable chain including a second tensioning cross member and a second continuous and unbroken inboard annular holder is formed from the tensioning cable and is disposed in physical communication with the first inboard annular holder. A third slidable receiver guide is disposed on the second inboard annular holder and is adapted to receive the tensioning cable. At least one cross member is disposed at a physical connection between the first inboard annular holder and the second inboard annular holder.

Further, this system comprises a new design for replaceable cable connectors for purposes of repairing a worn out or broken set of inventive cable chains.

Accordingly, the present application is a cable chain system that is easier to install than existing cable chain systems. The cable chain system can be fitted to a number of differently sized tires.

Further objects and advantages of the invention will be brought out in the following portions of the specification, wherein the detailed description is for the purpose of fully disclosing preferred embodiments of the invention, without placing limitations thereon.

BRIEF DESCRIPTION OF THE DRAWING(S)

The invention will be more fully understood by reference to the following drawings, wherein like elements are numbered alike:

FIG. 1 is an elevated perspective view of the outboard side of an automobile wheel and tire with the inventive cable chain system installed thereon.

FIG. 2 is an elevated perspective view of the inboard side of an automobile wheel and tire with the inventive cable chain system installed thereon.

FIG. 3 is a closeup sectional view of the tensioning cable extending across a tire from the outboard annular holder and forming the inboard annular holder.

FIG. 4A is a closeup elevated perspective view of the first receiver guide.

FIG. 4B is a closeup side view of the first receiver guide of FIG. 4A.

FIG. 5 is a closeup perspective view of the second receiver guide.

FIG. 6 is a side view of the hub of the inventive cable chain system.

FIG. 7 is an exploded perspective view of the hub of the inventive cable chain system.

FIG. 11A is a closeup side view of a cable connector.

FIG. 11B is a closeup side view of the cable connector of FIG. 1A shown being opened by a pliers for receiving an annular holder.

FIG. 11C is an elevated perspective view of the cable connector of FIG. 11A shown prior to assembly upon the cable chain system.

FIG. 11D is an elevated perspective view of the cable connector of FIG. 11A shown after assembly upon the cable chain system.

DETAILED DESCRIPTION

Figure 8:
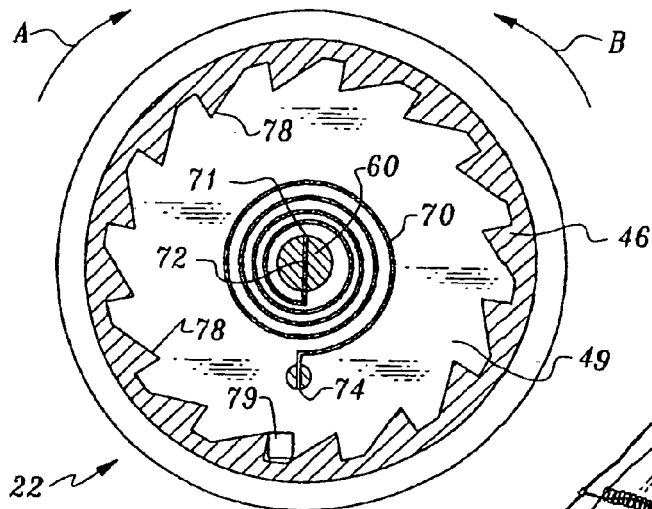
FIG. 8 is a partial cutaway view of the hub shown from the outboard side with its exterior face removed to view the inner workings of the hub.

FIG. 1 illustrates an outboard side perspective view of the cable chain system 10 attached to a tire 12 mounted on a car wheel 14. FIG. 2 illustrates the inboard view of the inventive system on the same tire and wheel. As shown the system is comprised of inboard 16 and outboard 18 annular holders having at least one cross member 20 extending from the inboard holder 16 to the outboard holder 18. The cable cross members 20 form the traction surface upon which the tire 12 depends to gain added traction on snow, ice, and mud. FIG. 1 illustrates the hub from which a tensioning cable 24 is spooled out to provide both cable slack and a self-tightening feature to the invention. Tensioning cable 24 is spooled from hub 22 and across the tire 12 to form the inboard annular holder 16. Hence, tensioning cable 24 forms both a cross member 20 and the inboard annular holder 16.

Figure 12:
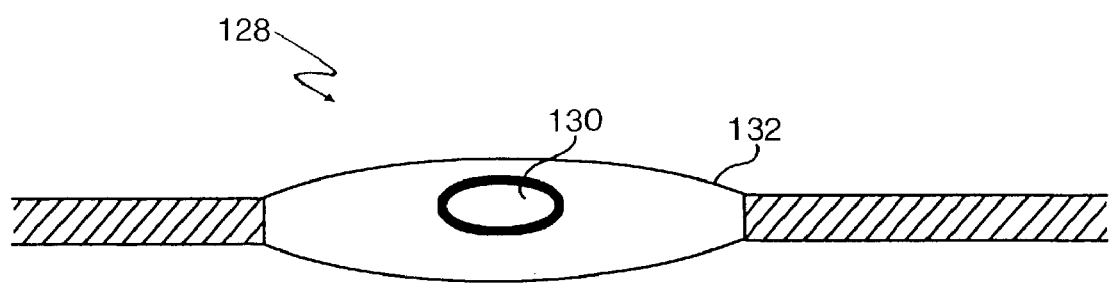
FIG. 12 is a side view of an exemplary receiver guide.
Figure 13:
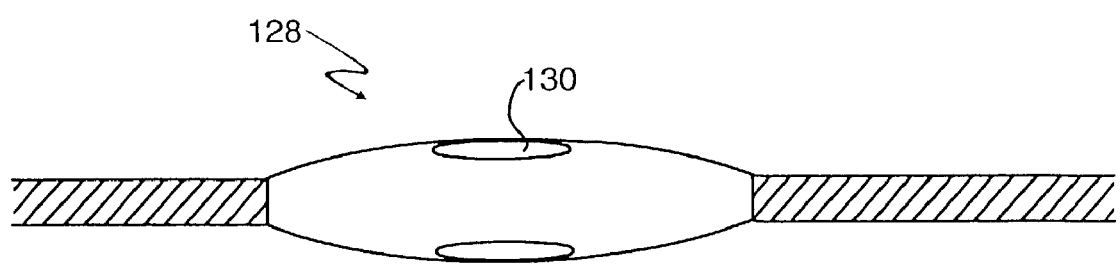
FIG. 13 is a top view of an exemplary receiver guide.

FIG. 3 illustrates the preferred manner in which the tensioning cable 24 forms both a cross member 20 and the inboard annular holder 16. Tensioning cable 24 extends from the outboard side 26 of the tire 12 to enter and exit a first slidable receiver guide 28 attached to the outboard holder 18 and then proceeds across to enter and exit a second slidable receiver guide 30 to form the inboard holder 16. After forming the inboard annular holder 16, the tensioning cable end 32 is coupled fixedly to the second receiver guide 30 by crimping it within sleeve 34. FIGS. 12 and 13 illustrate an alternate exemplary embodiment of a slidable receiver guide or smooth metal slidable receiver guide 128. The smooth metal slidable receiver guide 128 includes a passage 130 formed in a body 132. The passage receives the tensioning cable (not shown).

FIGS. 4A and 4B illustrate the main details of the first receiver guide 28 which is comprised of a center sleeve 36 having a greater diameter than the tension cable 24 so that the tension cable is freely slidable within the sleeve 36 for expanding or contracting the inboard annular holder 16. Perpendicular to the center sleeve 36 are second sleeves 38 through which the cable of the outboard annular holder 18 passes. The second sleeves 38 are crimped to hold the cable of the outboard annular holder 18 in a fixed position. The fixed position allows the receiver guide 28 to act as a leverage point for tensioning cable 24.

FIG. 5 shows the main details of the second receiver guide 30 which allows the tensioning cable 24 to exit the guide 30 at approximately a ninety degree angle to its entry orientation. The means for accomplishing this angled orientation of tensioning cable 24 is not limited, but some examples include a rounded corner having the proper curve to achieve the angled orientation or a pulley wheel 40 as shown in FIG. 5. Second receiver guide 30 further incorporates a sleeve 34 for receiving the end 32 of tensioning cable 24 and anchoring it therein, as previously described.

Referring again to FIG. 1, the hub 22 can be examined. The hub 22 is preferably positioned centrally upon the system 10 so that when the system is mounted on a tire 12, the hub 22 will be positioned substantially adjacent to the center of the wheel 14 of the automobile upon which the system 10 is mounted, thereby minimizing any centrifugal effect of the hub 22. The hub is stabilized centrally by first and second stabilizing cables 42, 44 located approximately 120 degrees apart from each other. Tensioning cable 24 forms the third cable for stabilizing the hub 22, is also approximately 120 degrees from either the first or the second stabilizing cables 42, 44.

Referring now to FIGS. 6–8 the main details of the hub 22 are shown. FIG. 6 shows hub 22 as including a housing 46 having a rotatable handle 48 located on the outboard face 50 of the housing 46. Handle 48 can have a knurled gripping surface 52, or the like, for slip-free operation. The inboard face of the housing 46 can be comprised of a neoprene pad 54, or other cushioning means to prevent the scratching of the wheel 14 by the hub 22. A hole 56 through the side 58 of the housing 46 provides an entry point for tensioning cable 24 to pass through to be anchored onto a spool shaft 60 that is perpendicularly and rotatably coupled to the handle 48 in a manner that will be further described below. Also shown is a lockable toggle switch 62 fits in toggle switch slot 63 in housing 46 which can be alternately engaged in a locking position or a free wheeling position as is further described below.

FIG. 7 is an exploded view of the hub 22 showing the main functional components. The housing of hub 22 is comprised of an outboard half 46 and an inboard half 49. The outboard half 46 fits inside of inboard half 49 to form the completed housing and outboard half 46 rotates freely within channel 47 of inboard half 49. Inboard half 49 is held stationary on the cable chain system 10 by stabilizing cables 42, 44 which are coupled by their ends 64 approximately 120 degrees apart on inboard half 49. Outboard half 46 is rotatably held within inboard half 49 by handle base 53 and the action of spool shaft 60, which is press-fit into cassette bearing 66. Inboard half 49 includes a bearing receiver (not shown) for receiving a cassette bearing 66. Handle 52, handle base 53 and spool shaft 60 can be an integral unit and spool shaft 60 is placed through hole 68 located in the center outboard face 50 of outboard half 46. Handle base 53 can be joined to outboard face 50 with adhesive, for example. Spool shaft 60 is seated in bearing 66, which in turn is seated in inboard half 49 as previously described. Handle 48, handle base 53, outboard half 46, and spool shaft 60 all turn simultaneously as a result of bearing 66 when tension cable 24 is pulled or released, or when directional force is applied to handle 48. Spool shaft 60 is surrounded by and coupled to coil spring 70 at its end 71 via slot 72. Additionally, coil spring 70 is coupled by its opposite end 74 to the stationary inboard half 49 as is further shown in FIG. 8. Coil spring 70 is thus positioned so that when tension cable 24 is pulled, the spring 70 coils, due to spool shaft's rotation in relation to the stationary inboard half 49 of the hub housing. The coiling spring builds potential energy that is transferred to kinetic energy when the pulled tension cable is released. Upon release, the tension cable 24 is pulled back inside of hub 22 as the spool shaft 60 rotates in the opposite direction of the pull. Tension cable 24 is connected to spool shaft 60 by its end, such as being frictionally engaged within cable receiver slot 76 of spool shaft. A toggle switch 62 movably couples to inboard half 49 for purposes of slidably engaging the ratchet teeth 78 in outboard half 46 and stopping the movement of spool shaft 60 and tensioning cable 24 as will be described in further detail below. A spool lock 500 shown at FIG. 18 can be included in the system to engage the spool in a non-rotatable condition.

Now referring also to FIG. 8 we see a partial cutaway view of the hub 22 with the outboard face 50, handle 48 and handle base 53 removed so that the inner workings of hub 22 can be further explained. Pushing toggle switch towards the outboard side of the hub 22 causes blocking member 79 to engage ratchet teeth 78, thereby stopping the rotation of the spool shaft 60 and movement of the tensioning cable 24. If sufficient force is applied by turning handle 48 in direction "A," as shown, the ratchet teeth 78 will slide over blocking member 79 of toggle switch 62 when rotating in that direction only. In the opposite direction "B," blocking member 79 cannot slide over ratchet teeth 78 and rotation in that direction is prevented. In this way, by rotating handle 48 in direction "A," the spool shaft 60 and tensioning cable 24 can be wound to a higher tension than that provided by coil spring 70 alone, thereby gathering up any remaining slack in the system and ensuring a snug fit upon a tire 12 on which the system 10 is installed. When toggle switch 62 is slidably disengaged from ratchet teeth 78 the outboard half 46A of the housing 46 and spool shaft 60 become free wheeling in relation to inboard half 46B. The tension provided by coil spring 70 winds the tensioning cable 24 into hub 22 in a free wheeling manner. In this way, the apparatus is self-tightening and efficiently gathers up slack remaining in the system. In operation, when the system 10 is being installed, the toggle switch 62 should remain disengaged to allow the slack to be taken out of the system 10 as it is being fitted on the tire 12. Alternately, if slack is needed, the free wheeling hub 22 will allow the tension cable 24 to be unwound when pulling force is applied to the tension cable.

Figure 9:
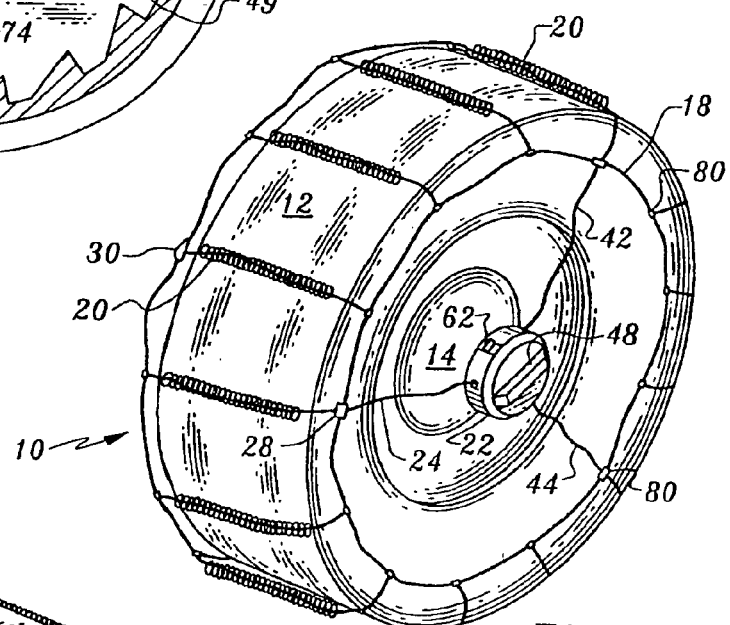
FIG. 9 is a front perspective view of the inventive cable chain system prior to being tightened upon an automobile wheel and tire.

FIG. 9 is an illustration of the system 10 in the process of being installed upon a tire 12. In this illustration the system 10 is in a slackened state due to the tension cable 24 being pulled out of the hub 22. Once a desired amount of slack is reached, the toggle switch 62 can be engaged to lock the system in the slackened state while it is being completely installed around the tire 12. This view also illustrates how the outboard annular holder 18 is static while the inboard annular holder 16 comprising the tensioning cable 24 is adjustable. A plurality of cable cross members 20 which comprise the traction surface are also shown. The system 10 is looped over the tread-exposed areas of the tire in its slackened state. The section of tread that remains on the ground can be covered by advancing the automobile a few feet until that tread section is exposed and the remainder of the system 10 can then be looped over the tire 12. The toggle switch 62 can then be disengaged from its locked position to allow the slack in the system to be gathered up. The toggle switch 62 can then be switched to a locked position again and turned in direction "A," as previously described to gather up any leftover slack.

Figure 10:
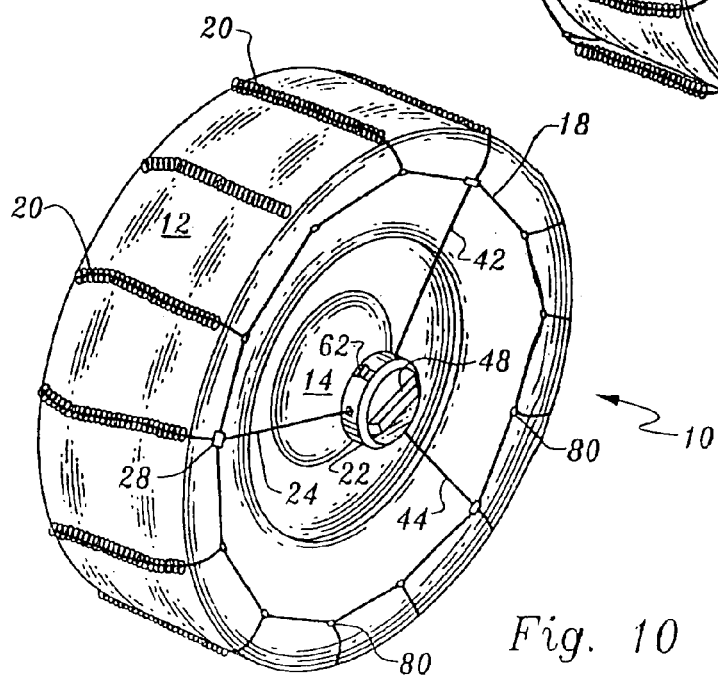
FIG. 10 is a front perspective view of the inventive cable chain system fully installed upon an automobile wheel and tire.

FIG. 10 is an illustration of the system 10 fully installed on a tire 12 with the slack removed and fitting snugly on the tire. In this state, the self-tensioning hub 22 has gathered up the slack in the system and/or the toggle switch 62 has been engaged and the handle 48 has been turned to ratchet in the remaining slack and lock the system 10 in the fully installed manner shown.

FIG. 11A illustrates an optional cable connector 80 which can be incorporated into the invention to allow for cable cross members 20 to be replaced upon wearing or breaking. The cable connector 80 is comprised of a spring steel outer shell 82 filled with a rubber filler 84, such as recycled tire rubber. The rubber filler 84 is divided from the front 94, inward, approximately halfway along its horizontal depth to create a partition 86 in which is inserted the cable of annular holder 16 or 18 to be held it in place. The partition 86 can further be drilled or rounded at its deepest recess 90 so as to accommodate and snugly enclose the cable of the annular holder 18, as shown in FIG. 11D. The rear 92 of the connector 80 is formed as a spring so that the driving force of the spring is applied upon the front 94 of the connector 80. To open the connector along its front, the rear can be placed in the jaws of a pliers 95 and a crimping force applied at the top 96 and bottom 98 of the rear 92 to pry the front 94 of the connector 80 open. Once open, annular holder 18 can be inserted. Upon closing the front of the connector, the driving force of the spring is such that the annular holder 18 is held snugly therein during normal road operating conditions. FIG. 11B shows the action of the connector 80 opening up on response to pressure being applied by a pliers 95.

FIG. 11C shows a connector 80 prior to assembly upon the cable chain system. FIG. 11D shows a connector 80 after assembly upon the cable chain system. Platform 81 is an extension of the bottom 91 of spring steel outer shell 82 and platform 81 has horizontal cuts 83 proceeding inward along its rear edge 85. Cuts 83 allow the outer edges 87a, 87b of platform 81 to be folded over and crimped upon a cable cross member 20 as shown in FIG. 11D, which also shows the annular holder 18 fitted into the connector 80. Also if desired a plurality of through-holes (not shown) can be placed along the rear surface of the outer shell 82 to provide an outlet for the molten rubber filler to ooze through, and grip tightly to the outer shell during manufacture. The outer shell can be dipped in molten rubber filler to fill in the inside of and also to coat outer shell 82.

Figure 14:
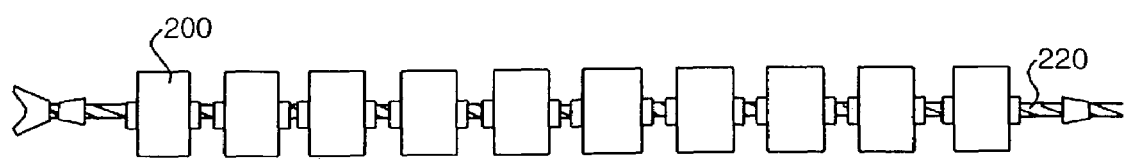
FIG. 14 is a top view of an exemplary crossmember with a plurality of exemplary traction members.
Figure 15:
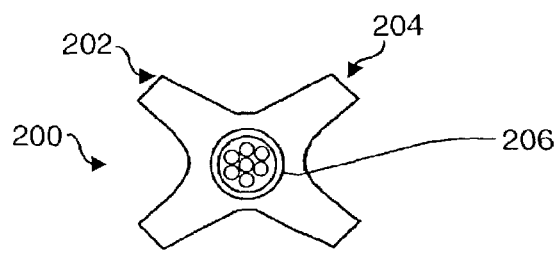
FIG. 15 is a side view of an exemplary traction member.

FIGS. 14 and 15 illustrate an exemplary traction member disposed on the cross members or cable 220. The traction member 200 includes a perimeter 202 formed with variations in shape to provide traction on surfaces to be traveled. An exemplary perimeter shape is a four pronged shape 204 as illustrated in FIG. 15. Other shapes are contemplated such as star shape and the like. The traction member is disposed over the cable in plural sets. A bushing 206 can be disposed at the center of the traction member 200 and comprise a durable material that can spin and slide freely on the cable 220 without braiding or wearing the cable 220.

Figure 16:
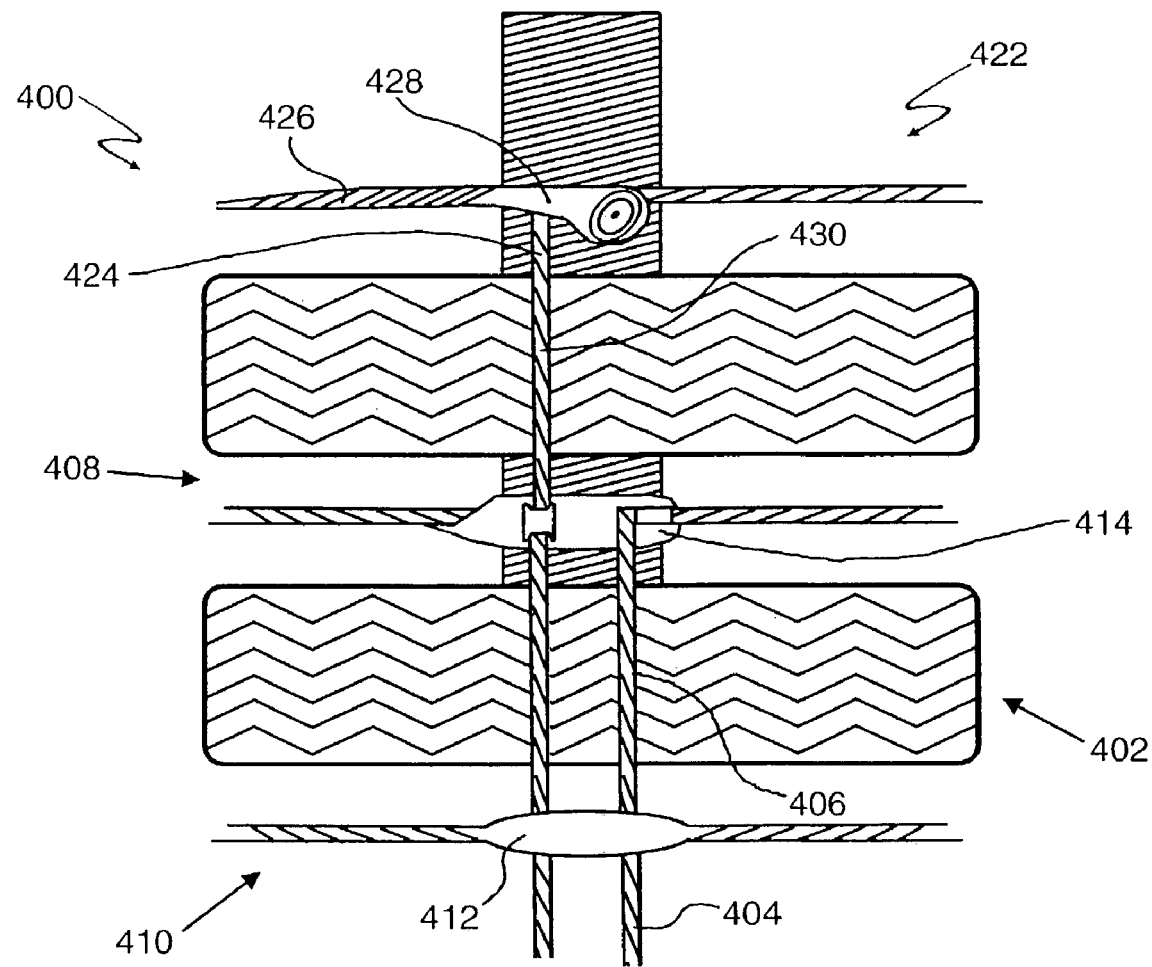
FIG. 16 is a top view of part of an exemplary dual wheel chain system.
Figure 17:
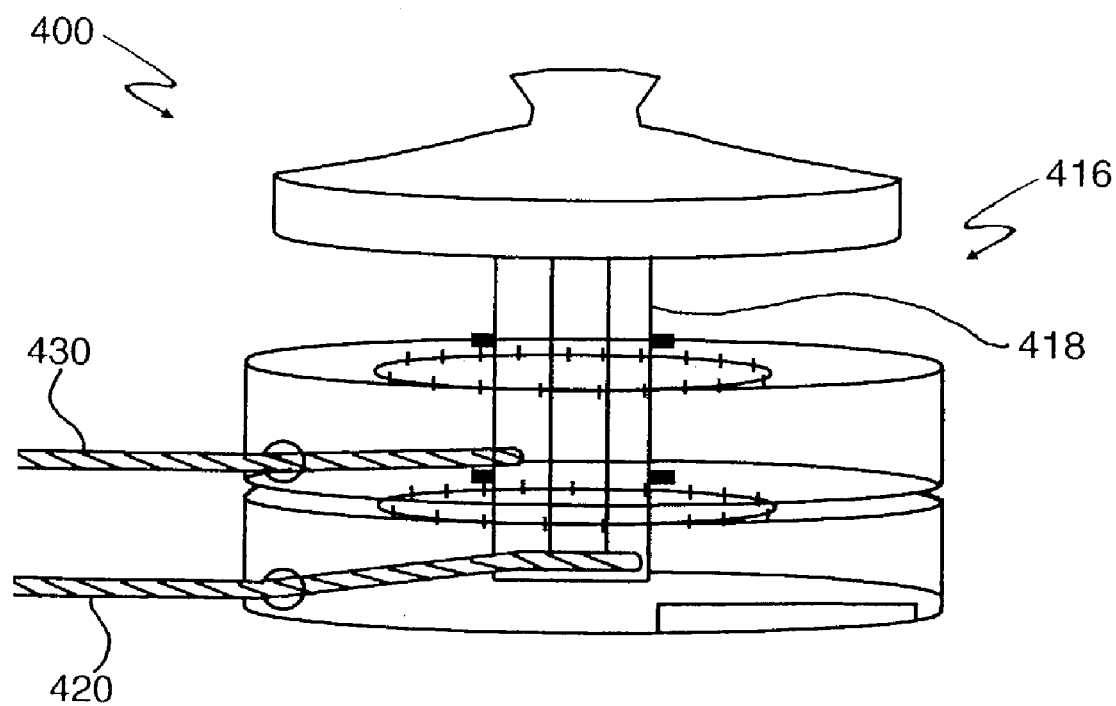
FIG. 17 is a perspective view of an exemplary hub and spool mechanism adapted for a dual wheel chain system.
Figure 18:
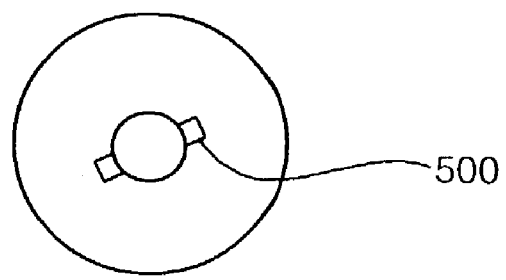
FIG. 18 is a plan view of an exemplary spool shaft and shaft lock.

FIG. 16 illustrated the arrangement of the dual tire application of the cable chain system. A dual wheel tire cable chain system 400 is illustrated in FIGS. 16, 17 and 18. In the dual wheel tire cable chain system 400 the essential features are present as in the single tire cable chain system above. A first tire cable chain 402 includes a first tensioning cable 404 adapted to form a first tensioning cross member 406 and a first continuous and unbroken inboard annular holder 408 disposed in physical contact with a first continuous and unbroken outboard annular holder 410. A first slidable receiver guide 412 is disposed on the first outboard annular holder 410 and adapted to receive the tensioning cable 404. A second slidable receiver guide 414 is disposed on the first inboard annular holder 408 and adapted to receive the tensioning cable 404.

At FIG. 17 a hub 416 is shown having a tensioned spool shaft 418 connected to the tensioning cable 404. At least one stabilizing cable 420 is connected to the hub 416 and the first outboard annular holder 410. The cross member 406 is disposed at a physical connection between the first outboard annular holder 410 and the first inboard annular holder 408. A second tire cable chain 422 includes a second tensioning cross member 424 and a second continuous and unbroken inboard annular holder 426 is formed from the tensioning cable 404 and disposed in physical communication with the first inboard annular holder 408. A third slidable receiver guide 428 is disposed on the second inboard annular holder 426 and adapted to receive the tensioning cable 424. At least one cross member 430 is disposed at a physical connection between the first inboard annular holder 408 and the second inboard annular holder 426. In an alternate exemplary embodiment, a single tensioning cable 424 can be configured to secure both the first and second tire chains. In an alternate exemplary embodiment, two tensioning cables can be secured to each one of the two tires in a dual tire system.

The foregoing detailed disclosure of the inventive cable chain system is considered as only illustrative of the preferred embodiment of, and not a limitation upon the scope of, the invention. Those skilled in the art will envision many other possible variations of the system for its use as disclosed herein that will nevertheless fall within the scope of any claims appended hereto. And, alternative uses for this system may later be realized. Accordingly, the scope of the invention should be determined with reference to any appended claims, and not solely by the examples which have herein been given.

What is claimed is:

1. A tire cable chain system, comprising:
   a continuous and unbroken outboard annular holder;
   a tensioning cable adapted to form at least one tensioning cross member and a continuous and unbroken inboard annular holder disposed in physical contact with said outboard annular holder;
   a first receiver guide disposed on said outboard annular holder and adapted to receive said tensioning cable;
   a second receiver guide disposed on said inboard annular holder and adapted to receive said tensioning cable;
   a hub having a tensioned spool shaft connected to said tension cable;
   at least one stabilizing cable connected to said hub and said outboard annular holder; and
   at least one cross member disposed at a physical connection between said outboard annular holder and said inboard annular holder.

2. The tire cable chain system of claim 1, wherein said tensioning cable is configured to stabilize said hub.

3. The tire cable chain system of claim 1, further comprising:
   an additional stabilizing cable connected to said hub and said outboard annular holder.

4. The tire cable chain system of claim 3, wherein said at least one stabilizing cable, said additional stabilizing cable, and said tensioning cable are disposed about 120 degrees apart from each other.

5. The tire cable chain system of claim 1, further comprising:
   at least one cable connector disposed in physical communication with said at least one cross member at said physical connection with said outboard annular holder and said inboard annular holder.

6. The tire cable chain system of claim 5, wherein said at least one cable connector further includes:
   a spring steel outer shell filled with a rubber filler, said rubber filler creates a partition for insertion of at least one of said outboard annular holder and said inboard annular holder.

7. The tire cable chain system of claim 6, wherein said at least one cable connector further includes:
   a platform configured to be folded over and crimped upon said at least one cross member.

8. The tire cable chain system of claim 1, wherein said hub comprises a scratch resistant material.

9. The tire cable chain system of claim 1, further comprising:
a spool lock disposed in said hub.

10. The tire cable chain system of claim 1, further comprising:
a handle disposed on said hub and configured to release and engage a ratchet disposed in said hub.

11. The tire cable chain system of claim 1, further comprising:
at least one traction member disposed on said cross member and said tensioning cross member.

12. The tire cable chain system of claim 11, wherein said at least one traction member is configured to create traction on a surface of travel.

13. The tire cable chain system of claim 11, wherein at least one material of said at least one traction member is selected from the group consisting of a metal and a rubber.

14. The tire cable chain system of claim 11, wherein said at least one traction member is configured in a design of at least four prongs spaced radially apart.

15. A method of installing tire cable chain system on a tire, comprising:
providing the tire cable chain system including:
a continuous and unbroken outboard annular holder disposed in physical contact with a tensioning cable adapted to form at least one tensioning cross member and a continuous and unbroken inboard annular holder;
a first receiver guide disposed on said outboard annular holder and adapted to receive said tensioning cable;
a second receiver guide disposed on said inboard annular holder and adapted to receive said tensioning cable;
a hub having a tensioned spool shaft connected to said tension cable;
at least one stabilizing cable connected to said hub and said outboard annular holder; and
at least one cross member disposed at a physical connection between said outboard annular holder and said inboard annular holder;
pulling said tensioning cable from said hub to create a slacks state of said tensioning cable;
engaging a toggle switch disposed in said hub to a locked position to retain said slack state;
disposing the tire cable chain system over the tire;
disengaging said toggle switch from said locked position; and
engaging said hub to tighten the tire cable chain system over the tire.

16. The method of claim 15, further comprising:
advancing the tire forward further disposing of the tire cable chain system over the tire.

17. The method of claim 15, further comprising:
locking the tire cable chain system over the tire with said hub.

18. A cable connector for a tire cable chain system, comprising:
a spring steel outer shell filled with a rubber filler, said rubber filler creates a partition for insertion of a cable of the tire cable chain; and
a platform configured to be folded over and crimped upon said cable.

19. A method of installing cross members to a tire cable chain system, comprising:
providing a cable connector having a rear portion and a front portion comprising:
a spring steel outer shell filled with a rubber filler creating a partition for insertion of a cable of the tire cable chain; and
a platform configured to be folded over and crimped upon said cable;
applying a gripping force to said rear portion of said cable connector;
disposing said front portion of said cable connector a continuous and unbroken outboard annular holder; and
crimping said platform of said cable connector onto a cross member.

* * * * *